United States Patent [19]

Hwang

[11] 4,299,630
[45] Nov. 10, 1981

[54] INFRARED ABSORPTIVE JET PRINTING INK

[75] Inventor: Ki-Sup Hwang, Fairborn, Ohio

[73] Assignee: The Mead Corporation, Dayton, Ohio

[21] Appl. No.: 791,380

[22] Filed: Apr. 27, 1977

[51] Int. Cl.$^3$ .................... C09D 11/02; C09D 11/08; C09D 11/10
[52] U.S. Cl. ........................................ 106/22; 106/20; 106/23; 260/29.2 N
[58] Field of Search ............................ 106/20, 22, 23; 252/62.1 L; 260/29.2 N, 2 EN; 8/37

[56] References Cited

U.S. PATENT DOCUMENTS

| | | | |
|---|---|---|---|
| 3,542,681 | 11/1970 | Mutaffis | 252/62.1 L |
| 3,579,286 | 5/1971 | Heid et al. | 8/37 |
| 3,705,043 | 12/1972 | Zabiak | 106/20 |
| 3,716,525 | 2/1973 | Engelhardt et al. | 8/37 |
| 3,805,273 | 4/1974 | Brady et al. | 346/75 |
| 3,846,141 | 11/1974 | Ostergren et al. | 106/22 |
| 3,870,528 | 3/1975 | Edds et al. | 106/22 |
| 3,903,034 | 9/1975 | Zabiak | 260/29.6 WB |

FOREIGN PATENT DOCUMENTS 2551242  5/1976  Fed. Rep. of Germany .

Primary Examiner—Howard E. Schain
Attorney, Agent, or Firm—Biebel, French & Nauman

[57] ABSTRACT

An improved infrared absorbing ink for jet printing comprises an aqueous solution of CI solubilized Sulfur Black, a thiosulfonic acid of 2,4-dinitrophenol, 1 dye with polyethylenimine as a binder. The preferred weight ratio is about 5 parts dye to 1.5 parts binder. Excessive cross-linking of the dye and the binder is prevented by adding sodium carbonate or other disclosed alkaline reagents in sufficient amount to prevent the pH of the solution from dropping below about 8.5 during a period of time equal to the expected shelf life of the ink.

The ink further comprises 4 to 10 percent by weight of a humectant to prevent water loss during use in a jet printer and 1 to 5 percent by weight of diethylene glycol to facilitate penetration of paper by the ink. The preferred embodiment also includes a bacteriacide/fungicide and a defoamer. The ink runs well in a multi jet printer, is waterproof when printed, smudge resistant and has a shelf life of over 1½ years. It has high absorptivity at infrared wavelengths and is optically black.

13 Claims, No Drawings

INFRARED ABSORPTIVE JET PRINTING INK

BACKGROUND OF THE INVENTION

This invention relates to printing inks and more particularly to infrared absorptive printing inks suitable for use in jet drop printers of the type disclosed in Brady et al, U.S. Pat. No. 3,805,273. Such printers print on a high-speed moving web by selective charging and catching of drops generated at a frequency in the order of about 50 kHz by each of the streams flowing from 500 or more orifices. These orifices have a diameter which may be less than about 2 mils, which requires that the printing ink be free of anything but the very smallest particulate matter. Generally speaking the ink must be operable after filtering through a 3 micron filter and preferably should be able to undergo filtering through a 0.65 micron filter.

Further, for use in such a jet drop printer the ink must be electrically conductive, having a resistivity below about 1000 ohm cm and preferably below about 500 ohm cm. For good runnability through small orifices the ink should have a viscosity in the range between about 1 to 10 centipose at 25° C. Over and above this the ink must be stable over a long period of time, compatable with the materials comprising the orifice plate and ink manifold, free of living organisms, and functional after printing. The required functional characteristics after printing are: sufficient light absorptivity at infrared wave lengths, smear resistance after printing, fast drying on paper, and waterproof when dry.

It will be appreciated that it is quite difficult to provide an ink which performs as required after printing and yet is suitable for use in such an ink jet printer. Generally speaking, water base inks have been found to be most suitable for use in such printers because of their conductivity and viscosity range, but heretofore there has been no such ink having fully satisfactory smudge-resisting, drying and waterproof characteristics. Moreover, the above problems, which exist for jet printing inks of all colors, are particularly severe when the ink is required to print characters which are readable by OCR readers operating in the infrared range of about 7,000-11,000 angstroms.

For many applications calling for infrared absorptive jet printing ink there is a concomitant requirement that the jet printed images be readable to the human eye. Generally speaking, human beings are accustomed to reading black printing, and it is therefore highly desirable that infrared absorptive jet printing inks be visually "black" as well as infrared absorbing. Accordingly prior art jet printing inks have avoided certain green dyes known to have infrared absorbing characteristics and generally have utilized water soluble nigrosine black dyes.

Typical prior art jet printing inks using nigrosine dye as an infrared absorbing agent are disclosed in Zabiak U.S. Pat. No. 3,705,043 and in Edds U.S. Pat. No. 3,870,528. While nigrosine is quite black to the eye and is a good infrared absorber, it tends to agglomerate and is difficult to maintain in suspension for a long time. As taught by Edds et al there are solvents which greatly reduce such agglomeration, and inks comprising such dye solvent compositions apparently perform satisfactorily in jet printers having relatively few jets. Such inks, however, have not been fully satisfactory in printers of the type disclosed in the above mentioned Brady et al patent.

SUMMARY OF THE INVENTION

This invention provides an improved infrared absorbing jet printing ink suitable for use in multi jet printers comprising an aqueous solution CI Solubilized Sulfur Black 1 dye with polyethylenimine as a binder. This composition provides excellent infrared absorption and permanency on paper substrates. Preferably the ratio of dye to polyethylenimine should be about 5:1.5 by weight, and the molecular weight of the polyethylenimine should be between about 300 and 1800. In order to limit cross-linking between the dye and the binder it is necessary to maintain the formulation at a pH greater than about 8.5. This may be accomplished by addition of about 0.1 to about 0.6 percent by weight of a pH stabilizer selected from the class consisting of sodium carbonate, ammonium sulfide, tripolyphosphate, and sodium phosphate tribasic.

To minimize loss of water during long periods of operation it is preferred that there be added about 4 to 10 percent by weight of a suitable humectant. Preferably the formulation also contains an effective amount of a bacteriacide and fungicide. Penetration of the ink into the paper can be enhanced significantly by addition of 1 to 5 percent by weight of diethylene glycol monobutyl ether.

DESCRIPTION OF THE PREFERRED EMBODIMENTS

A jet printing ink prepared in accordance with this invention comprises a water based formulation of CI solubilized Sulfur Black 1 dye and polyethylenimine. The Sulfur Black 1 dye provides the desired infrared absorbing properties for the ink, and the polyethylenimine acts as a binder between the dye molecules and a paper substrate imaged by the ink. Preferably the ink also comprises suitable amounts of a humectant, a penetrant for facilitating penetration of the paper by the ink, bacteriacidal and fungicidal additives, and a defoaming agent.

The water insoluble parent dye has the CI index 53185 and is strongly absorbent at infrared wavelengths. Its chemical structure is shown as 2,4-dinitrophenol. The dye of the present invention has the CI index 53186 and also is strongly absorbent at infrared wavelengths. It is solubilized by alkaline reduction or thiosulfurization in the presence of sodium hydroxide and is therefore a thiosulfonic acid derivative of the water insoluble parent dye. Such water soluble dyes are commercially available from American Cyanamid Company under the name Calco Soluble R and from Martin-Marietta Company under the name Sodyco Paper Black.

Since the dye is soluble in water, it tends to wash off when printed. Unexpectedly it has been found that CI solubilized Sulfur Black 1 dye can produce a strongly waterproof image if the dye is combined in solution with a suitable amount of polyethylenimine. A preferred ratio is about 5 parts dye to 1.5 parts polyethylenimine.

The chemical structure of polyethylenimine is quite different from that of the linearly structured binders and solubilizers such as styrenemaleic anhydride resins and carboxylated polyvinyl acetate resins employed in prior art jet printing inks. Polyethylenimine has a generally spherical molecular structure, consisting of many branched segments, with tertiary amine nitrogen groups as the branching sites and primary amine nitrogen groups as the terminal groups of each segment. In aqueous solution with the dye, the polyethylenimine functions as a cationic polyelectrolyte, having a strong affinity for the dye molecules and also for a printing paper surface.

When the Sulfur Black 1 dye is combined in solution with the binder the formulation initially has a pH of about 10.0. This is a very suitable pH for ink jet printing, and the ink performs quite well if used soon after formulation. However, it has been observed that cross-linking between the dye and the polyethylenimine continues over a period of time with an accompanying decrease in pH. After the pH drops to about 8.5 the ink begins to jel and is no longer suitable for jet printing.

It has been found that the addition to the formulation of about 0.1 percent by weight of an alkaline reagent such as sodium carbonate improves stability and shelf life by stabilizing the pH and slowing down the above mentioned cross-linking. When the amount of sodium carbonate is increased to about 0.3 percent by weight the ink becomes completely stable, as evidenced by exposure in an oven at 45° C. for five days without any apparent jelling. This corresponds to a shelf life of at least 1½ years. When used in amounts above about 0.6 percent by weight the sodium carbonate begins to attack paper fibers and the ink formulation is no longer suitable for the intended purpose. While sodium carbonate is preferred for use as a pH stabilizer, other agents such as ammonium sulfide, tripolyphosphate, and sodium phosphate tribasic have also been found to be suitable. Somewhat surprisingly sodium hydroxide has been found unsuitable.

Preferably the polyethylenimine polymer should have two carbons per nitrogen with approximate ratios of 1:2:1 between primary, secondary and tertiary amino nitrogen groups. Moreover, in order to achieve stream stimulation in a jet printer of the multi jet type, the molecular weight of the polyethylenimine should be in the range between about 300 and 10,000. Stimulation is best at the lower end of the range, and the preferred range in molecular weight is between 300 and 1800. Suitable anhydrous polyethylenimine is commercially available from Dow Chemical Company under any of the names PEI 3, PEI 6, PEI 12, or PEI 18.

It is well known that jet drop printing inks should contain a humectant in order to minimize undesired drying of the ink within the print head. For a printer of the type described in the above mentioned Brady patent it is common to run a flush fluid through the print head prior to startup and to flush the print head again after shutdown. Ordinarily ink is not permitted to stand for a long period of time in the print head, and this reduces ink drying significantly. To further reduce such problems any of numerous humectants mentioned in Zabiak U.S. Pat. No. 3,705,043 or in Ostergren et al U.S. Pat. No. 3,846,141 may be added to the ink formulation. These include alkylene glycols and alkyl ethers of alkylene glycols in which the alkylene group contains 2-6 carbon atoms and the alkyl group contains 1-6 carbon atoms. Another suitable humectant has been found to be N-(2-hydroxyethyl) formamide. A range of about 1 to 5 percent by weight of the humectant is preferred.

It has also been found that the ink will penetrate a paper surface quickly thereby avoiding smudging and smearing if about 1 percent to 5 percent by weight of a penetrant is added to the formulation. A suitable penetrant which has been satisfactorily tested is Butyl Carbitol, a proprietary product sold by Union Carbide and known generically as diethylene glycol monobutyl ether. The ink formulation also should have a suitable bacteriacide/fungicide and a defoamer. A good bacteriacide/fungicide has been found to be 8-quinolinol citrate. A good defoamer is a mixture of equal proportions by weight of Surfynol 104, a non-ionic surfactant medium manufactured by Air Products and Chemical Company, and N-methyl-2-pyrrolidone added in minor amount to the formulation.

The ratio of CI solubilized Sulfur Black 1 dye to polyethylenimine is particularly important in the practice of this invention in order to react the activated double bond of the dye with polyethylenimine in an aqueous solution, thus giving a product capable of printing a hydrophobic image on a paper substrate. The preferred ratio is about 5:1.5 by weight, but some variation is permissible depending upon the specific application. In general it has been found that the dye should be present in the formulation in a range between about 3 percent and 10 percent by weight, while the polyethylenimine should be present in a range between about 0.9 percent and 3.1 percent by weight. More preferably the ranges are 4 to 7 percent for the dye and 1.3 to 2.0 percent for the binder. Again, as discussed above, the pH of the formulation should be stabilized to remain above about 8.5 for the expected shelf life of the ink.

The following examples illustrate the invention, all percentages being given by weight.

EXAMPLE 1

| | |
|---|---|
| PEI 3 | 1 percent |
| CI Solubilized Sulfur Black 1 | 6 percent |
| Triethylene Glycol | 9 percent |
| Deionized Distilled Water | 84 percent |

A piece of paper printed with this ink exhibited only slight bleeding when immersed in water. However, since there was no pH adjustment, the cross-linking between the dye and the polyethylenimine binder (PEI 3) continued to the point where the formulation began to jel.

EXAMPLE 2

| | | |
|---|---|---|
| PEI 3 | 1.5 | percent |
| CI Solubilized Sulfur Black 1 | 5 | percent |
| Triethylene Glycol | 9.5 | percent |
| Butyl Carbitol | 3.3 | percent |
| Deionized Distilled Water | 80.7 | percent |

The addition of the Butyl Carbitol was observed to cause fast penetration and drying of the ink on the paper. As a consequence almost no bleeding was observed when a piece of paper printed with the ink was immersed in water. Again there was excessive cross-linking between the dye and the binder. The initial pH was about 10.0, and the performance of the ink was satisfactory until the pH dropped below about 8.5.

EXAMPLE 3

| | | |
|---|---|---|
| PEI 6 | 1.3 | percent |
| CI Solubilized Sulfur Balck 1 | 5.5 | percent |
| N-(2-hydroxyethyl) formamide | 5.5 | percent |
| Butyl Carbitol | 3.3 | percent |

| -continued | | |
|---|---|---|
| Bacteriacide | 0.4 | percent |
| Deionized Distilled Water | 84 | percent |

In this formulation the N-(2-hydroxyethyl) formamide was found to be a satisfactory humectant in place of the triethylene glycol utilized in the preceding example. However, the bacteriacide employed was a proprietary formulation which proved to be unstable in solution. The pH was not controlled.

EXAMPLE 4

| PEI 6 | 1.3 | percent |
|---|---|---|
| Tripropylene Glycol | 9 | percent |
| CI Solubilized Sulfur Black 1 | 5.5 | percent |
| Butyl Carbitol | 3.3 | percent |
| Deionized Distilled Water | 80.9 | percent |

The tripropylene glycol of this formulation was observed to be a satisfactory humectant. The pH was not controlled.

EXAMPLE 5

| PEI 6 | 1.5 | percent |
|---|---|---|
| Triethylene Glycol | 9.5 | percent |
| CI Solubilized Sulfur Black 1 | 5 | percent |
| Butyl Carbitol | 2.5 | percent |
| 8-Quinolinol Citrate | 0.1 | percent |
| Deionized Distilled Water | 81.4 | percent |

The 8-quinolinol citrate of this formulation functions as a fungicide and bacteriacide. It was found to be stable in solution and to have no deleterious effect on the functionality of the ink. The increase in triehtylene glycol from 9 percent to 9.5 percent was observed to reduce loss of water. Again the pH was not controlled.

EXAMPLE 6

| PEI 6 | 1.5 | percent |
|---|---|---|
| Triethylene Glycol | 5.5 | percent |
| CI Solubilized Sulfur Black 1 | 5 | percent |
| Butyl Carbitol | 2.5 | percent |
| 8-Quinolinol Citrate | 0.2 | percent |
| Sodium Carbonate | 0.1 | percent |
| Deionized Distilled Water | 85.2 | percent |

In this formulation the bacteriacide was again stable. For preferred bacteriacidal and fungicidal properties about 0.2 percent of this particular bacteriacide is desired. The sodium carbonate of this formulation raised the initial pH from about 10.0 to about 10.5. The ink was stable for three days at 45° C. It was found that the ink became stable for more than four days at 45° C. when the sodium carbonate was increased to 0.2 percent.

EXAMPLE 7

| PEI 6 | 1.5 | percent |
|---|---|---|
| Triethylene Glycol | 5.5 | percent |
| CI Solubilized Sulfur Black 1 | 5 | percent |
| Butyl Carbitol | 3.1 | percent |
| 8-Quinolinol Citrate | 0.2 | percent |
| Sodium Carbonate | 0.3 | percent |
| Deionized Distilled Water | 84.4 | percent |

The sodium carbonate of this formulation produced an ink which showed no signs of jelling after five days at 45° C. However, a slight foaming problem was observed in this formulation, as well as for the formulations of all preceding examples. As shown in the next example this can be corrected by adding a defoaming mixture of 50 percent Surfynol 104 and 50 percent N-methyl-2-pyrrolidone.

EXAMPLE 8

| PEI 6 | 1.5 | percent |
|---|---|---|
| Triethylene Glycol | 5.5 | percent |
| Surfynol 104 | 0.1 | percent |
| N-Methyl-2-Pyrrolidone | 0.1 | percent |
| Butyl Carbitol | 3.1 | percent |
| 8-Quinolinol Citrate | 0.2 | percent |
| CI Solubilized Sulfur Black 1 | 5 | percent |
| Sodium Carbonate | 0.3 | percent |
| Deionized Distilled Water | 84.2 | percent |

The formulation of this example was observed to be capable of filtration through a 0.2 micron filter without deleterious effects. The formulation after filtration was observed to produce printed images which were extremely waterproof and almost completely smear resistant. Moreover, printed images made with this formulation were observed to be highly infrared absorptive after four days of exposure in an Atlas Fade-O-Meter exposure chamber.

Table 1 below presents PCR figures at infrared wave lengths for images printed with the formulation of Example 8 on four different types of paper and immersed in water at 25 degrees Celsius for different periods of time. As used herein the PCR figure is the ratio of the difference between unprinted and printed area reflectance to unprinted area reflectance.

TABLE 1

| Paper Stocks To Be Printed | PCR Initial Hours Immersed In Water at 25° C. | | | | | |
|---|---|---|---|---|---|---|
| | PCR | 24 | 48 | 72 | 96 | 120 |
| Mead Bond | 0.83 | 0.83 | 0.83 | 0.83 | 0.83 | 0.83 |
| IBM Bond | 0.83 | 0.83 | 0.82 | 0.82 | 0.82 | 0.82 |
| kraft | 0.79 | 0.78 | 0.78 | 0.78 | 0.78 | 0.78 |
| Victory Bond | 0.83 | 0.83 | 0.83 | 0.83 | 0.83 | 0.83 |

Table I shows that the ink of this invention in preferred embodiment is almost completely waterproof. Moreover, it should be observed that prior art infrared absorbing jet drop printing ink have PCR figures at infrared wavelengths in the order of about 0.75 before immersion in water and generally experience a substantial PCR reduction soon to be after immersion. For applications wherein printed images are to be read by an OCR reader, a PCR of at least about 0.70 is usually required.

The formulation of example 8 has all rheological and conductivity properties required for use in the above mentioned multi jet printer. The formulation has been tested for extended periods of time on such a printer and found to function satisfactorily with minimum loss of volatile content.

What is claimed is:

1. A jet printing ink which has high light absorptivity at infrared wave lengths and smear resistance after printing, is fast drying on paper and waterproof when dry comprising:

as the dye component, the thiosulfonic acid of 2,4-dinitrophenol present in the ink in the range from about 3 percent to about 10 percent by weight, polyethyleneimine in a molecular weight range from about 300 to about 10,000 as a binder for said dye and present in the ink in the range from about 0.9 percent to about 3.1 percent by weight, and the balance water;

the formulation further containing a pH stabilizer selected from the group consisting of sodium carbonate, ammonium sulfide, tripolyphosphate, and sodium phosphate tribasic to maintain a pH greater than about 8.5 in order to improve the stability and shelf life of said formulation without adversely affecting the on-paper characteristics of the ink, said formulation also having a resistivity below about 1000 ohm cm and a viscosity of 1–10 cp at 25° C.

2. A jet printing ink according to claim 1 and further comprising diethylene glycol monobutyl ether in the range from about 1 percent to about 5 percent by weight.

3. A jet printing ink according to claim 2 and further comprising about 4 percent to about 10 percent by weight of a humectant selected from the group consisting of N-(2-hydroxyethyl) formamide, alkylene glycols, and alkyl ethers of alkylene glycols in which the alkylene group contains 2–6 carbon atoms and the alkyl group contains 1–6 carbon atoms.

4. A jet printing ink according to claim 3 further comprising an effective amount of 8-quinolinol citrate as a bacteriacide and fungicide.

5. A jet printing ink according to claim 1 wherein the weight ratio said dye to polyethylenimine is about 5:1.5.

6. A jet printing ink according to claim 5 wherein the molecular weight of the polyethylenimine is below 1800.

7. A jet printing ink according to claim 6 wherein said dye is present in an amount between about 4 percent and 7 percent by weight.

8. A jet printing ink according to claim 7 wherein polyethylenimine is present in an amount between about 1.3 percent and 2 percent by weight.

9. A jet printing ink according to claim 6 and further comprising about 4 percent to about 10 percent by weight of a humectant selected from the group consisting of triethylene glycol, tripropylene glycol and N-(2-hydroxyethyl) formamide.

10. A jet printing ink according to claim 7 and further comprising diethylene glycol monobutyl ether in the range from about 1 percent to about 5 percent by weight.

11. A jet printing ink which has high light absorptivity at infrared wave lengths and smear resistance after printing, is fast drying on paper and waterproof when dry comprising:

about 4 percent to about 7 percent by weight of the thiosulfonic acid of 2,4-dinitrophenol as the dye, about 0.9 percent to about 3.1 percent by weight of polyethylenimine having a molecular weight in the range between about 300 and 1,800, about 1 percent to about 5 percent by weight of diethylene glycol monobutyl ether, about 4 percent to about 10 percent by weight of a humectant selected from the group consisting of triethylene glycol, tripropylene glycol and N-(2-hydroxyethyl) formamide, an effective amount of 8-quinolinol citrate as a bacteriacide and fungicide, about 0.1 percent to about 0.6 percent by weight of a pH stabilizer selected from the group consisting of sodium carbonate, ammonium sulfide, tripolyphosphate, and sodium phosphate tribasic to maintain a pH greater than about 8.5 in order to improve the stability and shelf life of the formulation without adversely affecting the on-paper characteristics of the ink, and the balance water.

12. A jet printing ink as in claim 11 comprising:

about 5 percent by weight of the thiosulfonic acid of 2,4-dinitrophenol as the dye, about 1.5 percent by weight of polyethylenimine having a molecular weight in the range between about 300 and 1800, about 3.1 percent by weight of diethylene glycol monobutyl ether, about 5.5 percent by weight of triethylene glycol, about 0.2 percent by weight of 8-quinolinol citrate, about 0.3 percent by weight of sodium carbonate, and the balance water.

13. A jet printing ink according to claim 12 and further comprising:

about 0.1 percent by weight of N-methyl-2-pyrrolidone, and about 0.1 percent by weight of a non-ionic surfactant medium.

* * * * *